United States Patent
Balasubramanian et al.

(10) Patent No.: US 12,471,177 B2
(45) Date of Patent: Nov. 11, 2025

(54) APPLICATION SPECIFIC WAKE UP SIGNALS FOR SIDELINK SYSTEMS

(71) Applicant: QUALCOMM Incorporated, San Diego, CA (US)

(72) Inventors: Anantharaman Balasubramanian, San Diego, CA (US); Shuanshuan Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 542 days.

(21) Appl. No.: 17/950,045

(22) Filed: Sep. 21, 2022

(65) Prior Publication Data
US 2024/0098840 A1 Mar. 21, 2024

(51) Int. Cl.
*H04W 76/28* (2018.01)
*H04W 52/02* (2009.01)

(52) U.S. Cl.
CPC ....... *H04W 76/28* (2018.02); *H04W 52/0229* (2013.01)

(58) Field of Classification Search
CPC ............. H04W 76/28; H04W 52/0229; H04W 52/0216; H04W 76/14
See application file for complete search history.

(56) References Cited

U.S. PATENT DOCUMENTS

2023/0164735 A1\* 5/2023 Si ........................... H04L 5/0091
 455/456.1
2024/0049343 A1\* 2/2024 Back ....................... H04W 4/40

FOREIGN PATENT DOCUMENTS

EP 4188019 A1 \* 5/2023 ........... H04L 5/0048

\* cited by examiner

*Primary Examiner* — Ayanah S George
(74) *Attorney, Agent, or Firm* — Arent Fox, LLP

(57) ABSTRACT

A first user equipment (UE) wakes up a second UE to request information using an application specific sidelink wake up signal (SL-WUS). The first UE determines a sidelink configuration of the second UE that is configured with a discontinuous reception (DRX) mode. The first UE transmits the SL-WUS on a configured resource monitored by the second UE during the DRX mode. A selection of a sequence of the SL-WUS or a selection of the configured resource indicates a type of information requested by the first UE. The second UE receives the SL-WUS, wakes up during a DRX on duration, and transmits the requested information. The first UE receives the type of information requested by the first UE.

28 Claims, 12 Drawing Sheets

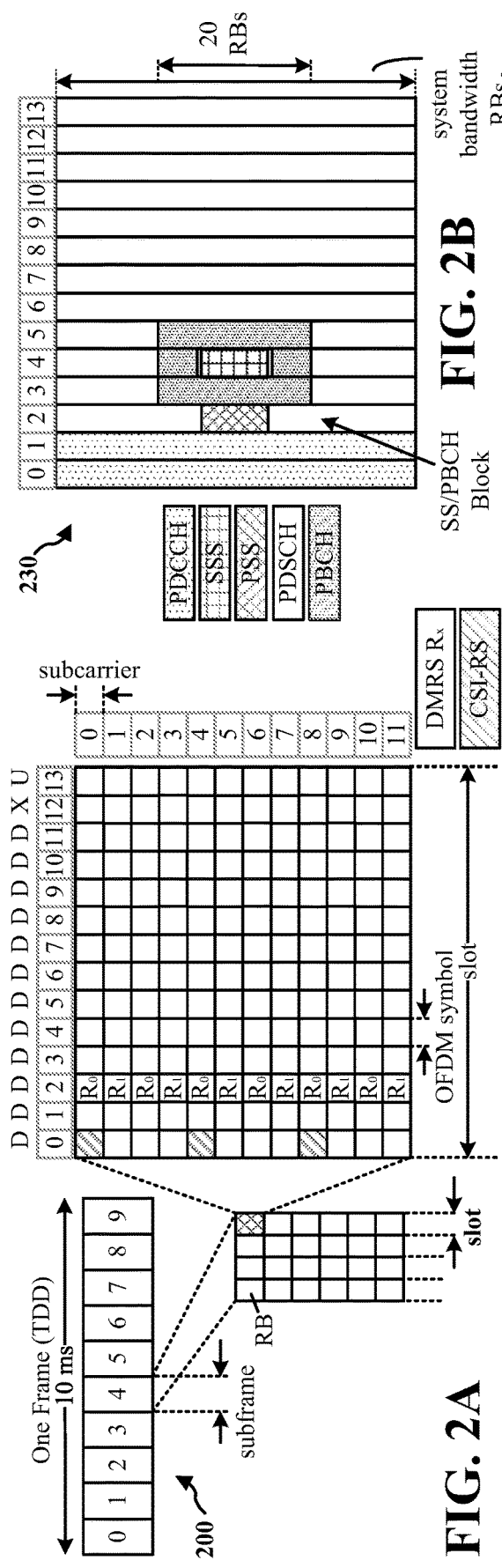
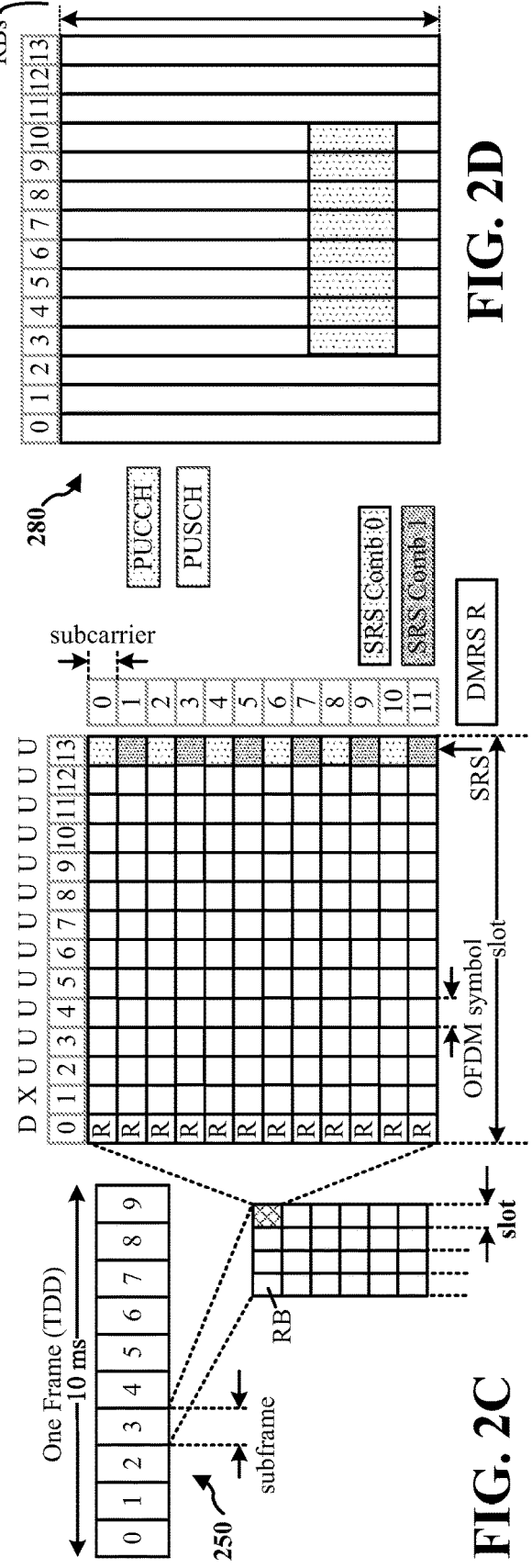
FIG. 2A
FIG. 2B
FIG. 2C
FIG. 2D

APPLICATION SPECIFIC WAKE UP SIGNALS FOR SIDELINK SYSTEMS

BACKGROUND

Technical Field

The present disclosure relates generally to communication systems, and more particularly, to apparatuses and methods of congestion control for power saving user equipment in direct link communications between two devices.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the disclosure provides a method of wireless communication for a first user equipment (UE), including: determining a sidelink configuration of a second UE that is configured with a discontinuous reception (DRX) mode; transmitting a sidelink wake up signal on a configured resource monitored by the second UE during the DRX mode, wherein a selection of a sequence of the sidelink wake up signal or a selection of the configured resource indicates a type of information requested by the first UE; and receiving, from the second UE, the type of information requested by the first UE.

In some aspects, the techniques described herein relate to a method, wherein selection of a first sequence indicates a request for a reference signal or sidelink synchronization signal and selection of a second sequence indicates a request for data.

In some aspects, the techniques described herein relate to a method, wherein a sequence on a first configured resource indicates a request for a reference signal and the sequence on a second configured resource indicates a request for data.

In some aspects, the techniques described herein relate to a method, wherein the selection of the sequence for the sidelink wake up signal is based on a mapping from a provider service identifier (PSID) to a destination ID at a vehicle to anything (V2X) layer.

In some aspects, the techniques described herein relate to a method, wherein the sidelink wake up signal carries the destination ID.

In some aspects, the techniques described herein relate to a method, wherein the sidelink wake up signal implies a time window during which the first UE receives the type of information requested by the first UE.

In some aspects, the techniques described herein relate to a method, wherein the sidelink wake up signal implies a parameter of a data transmission.

In some aspects, the techniques described herein relate to a method, further including transmitting scheduling information after the sidelink wake up signal.

In some aspects, the techniques described herein relate to a method, wherein the sidelink wake up signal is on behalf of a group of UEs, wherein the type of information requested by the first UE is received via a groupcast message.

In some aspects, the techniques described herein relate to a method, further including configuring a time window for the group of UEs to receive the groupcast message.

In some aspects, the techniques described herein relate to a method, wherein the sidelink wake up signal includes a groupcast identifier on a configured resource that indicates a type of information for the group of UEs.

In some aspects, the techniques described herein relate to a method, wherein the configured resource monitored by the second UE during a DRX mode is within a slot offset after a slot configured for a sidelink synchronization signal block (S-SSB) of the second UE.

In some aspects, the techniques described herein relate to a method, further including transmitting a sidelink related cell wake up signal that requests a base station to transmit system information for sidelink communication.

The disclosure also provides an apparatus (e.g., a user equipment) including a memory storing computer-executable instructions and at least one processor configured to execute the computer-executable instructions to perform the above methods for the first UE, an apparatus including means for performing the above methods for the first UE, and a computer-readable medium storing computer-executable instructions for performing the above methods for the first UE.

In some aspects, the techniques described herein relate to a method of wireless communication for a second user equipment (UE), including: determining a sidelink configuration for the second UE including a discontinuous reception (DRX) mode; receiving, from a first UE, a sidelink wake up signal on a configured resource monitored by the second UE during the DRX mode, wherein selection of a sequence of the sidelink wake up signal or a selection of the configured resource indicates a type of information requested by the first UE; and transmitting the type of information requested by the first UE.

In some aspects, the techniques described herein relate to a method, wherein selection of a first sequence indicates a request for a reference signal or sidelink synchronization signal and selection of a second sequence indicates a request for data.

In some aspects, the techniques described herein relate to a method, wherein a sequence on a first configured resource indicates a request for a reference signal and the sequence on a second configured resource indicates a request for data.

In some aspects, the techniques described herein relate to a method, further including mapping, at a vehicle to anything (V2X) layer, a destination ID of the sidelink wake up signal to a sidelink process identifier (PSID).

In some aspects, the techniques described herein relate to a method, wherein the sidelink wake up signal carries the destination ID.

In some aspects, the techniques described herein relate to a method, wherein transmitting the type of information requested by the first UE includes transmitting the type of information requested by the first UE within a time window based on the sidelink wake up signal.

In some aspects, the techniques described herein relate to a method, wherein the sidelink wake up signal implies a parameter of a data transmission.

In some aspects, the techniques described herein relate to a method, further including receiving sidelink scheduling information after the sidelink wake up signal.

In some aspects, the techniques described herein relate to a method, wherein the sidelink wake up signal is on behalf of a group of UEs, wherein transmitting the type of information requested by the first UE includes transmitting a groupcast message.

In some aspects, the techniques described herein relate to a method, further including determining a time window for the group of UEs to receive the groupcast message based on the sidelink wake up signal.

In some aspects, the techniques described herein relate to a method, wherein the sidelink wake up signal includes a groupcast identifier on a configured resource that indicates a type of information for the group of UEs.

In some aspects, the techniques described herein relate to a method, wherein the configured resource monitored by the second UE during a DRX mode is within a slot offset after a slot configured for a sidelink synchronization signal block (S-SSB) of the second UE.

The disclosure also provides an apparatus (e.g., a user equipment) including a memory storing computer-executable instructions and at least one processor configured to execute the computer-executable instructions to perform the above methods for the second UE, an apparatus including means for performing the above methods for the second UE, and a computer-readable medium storing computer-executable instructions for performing the above methods for the second UE.

In some aspects, the techniques described herein relate to a method of wireless communication for a base station, including: receiving a sidelink related cell wake up signal that requests system information for sidelink communication; and transmitting one or more system information blocks that define sidelink communication parameters in response to the sidelink related cell wake up signal.

The disclosure also provides an apparatus (e.g., a base station (BS)) including a memory storing computer-executable instructions and at least one processor configured to execute the computer-executable instructions to perform the above methods for the BS, an apparatus including means for performing the above methods for the BS, and a computer-readable medium storing computer-executable instructions for performing the above methods for the BS.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first 5G NR frame.

FIG. 2B is a diagram illustrating an example of downlink channels within a 5G NR subframe.

FIG. 2C is a diagram illustrating an example of a second 5G NR frame.

FIG. 2D is a diagram illustrating an example of uplink channels within a 5G NR subframe.

DETAILED DESCRIPTION

Figure 1:
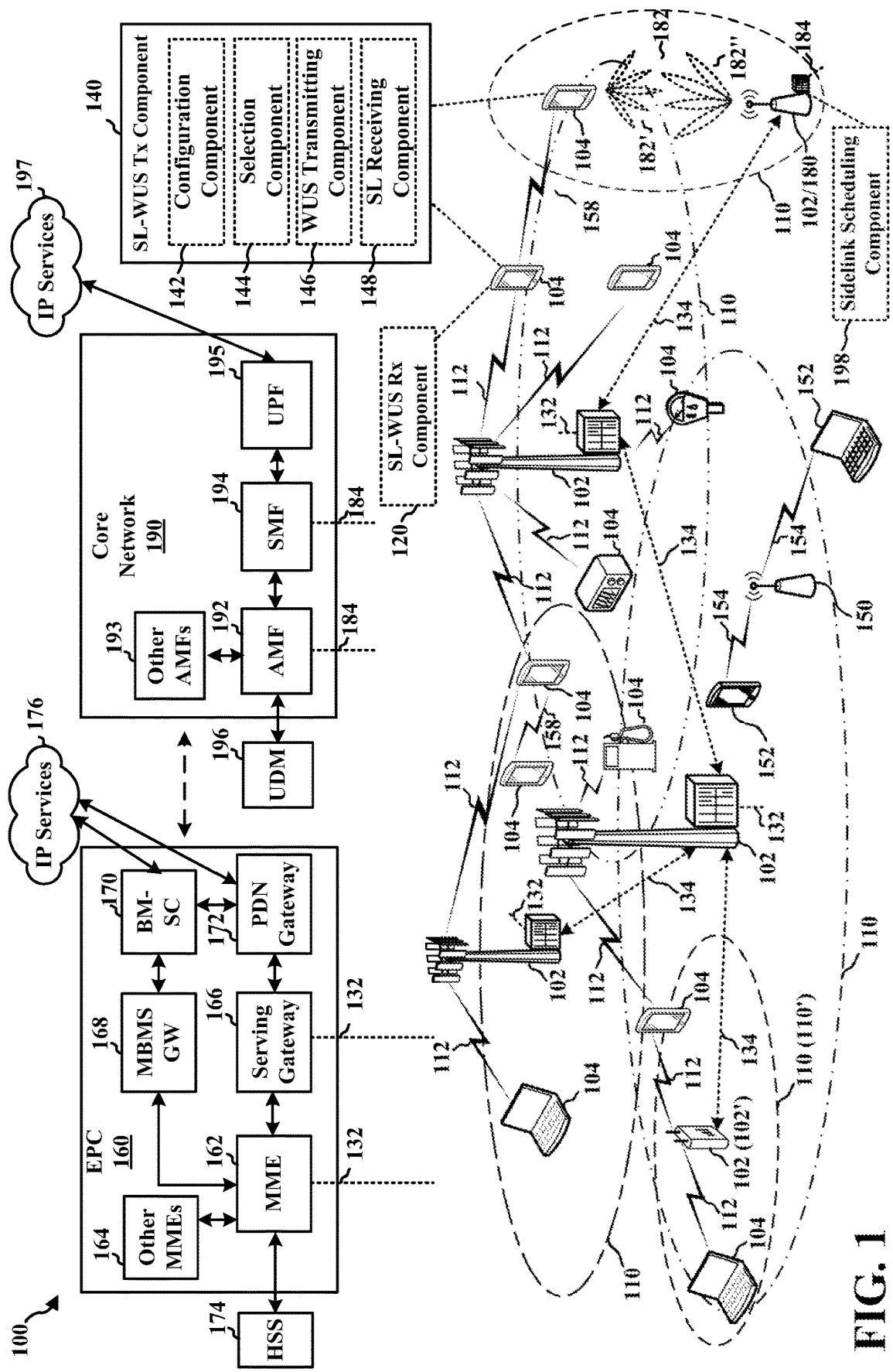
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The described features generally relate to wake up signals (WUS) for sidelink communications, which may also be referred to as direct link communications. As used herein, a direct link refers to a direct wireless communications path from a first wireless device to a second wireless device. For example, in fifth generation (5G) new radio (NR) communication technologies a direct link between two user equipment (UEs) may be referred to as a sidelink (SL), as opposed to communications over the Uu interface (e.g., from gNB to user equipment (UE). Direct links may be utilized in D2D communication technologies that can include vehicle-to-vehicle (V2V) communications, vehicle-to-infrastructure (V2I) communications (e.g., from a vehicle-based communication device to road infrastructure nodes), vehicle-to-network (V2N) communications (e.g., from a vehicle-based communication device to one or more network nodes, such as a base station), a combination thereof and/or with other devices, which can be collectively referred to as vehicle-to-anything (V2X) communications. In V2X communications, vehicle-based communication devices can communicate with one another and/or with infrastructure devices over a direct link channel.

One concern with D2D communications is power conservation among devices. The Uu interface includes several mechanisms for both UEs and base stations to enter a low power mode such as discontinuous reception (DRX) and wake up for communications. For example, wake up signals (WUS) were introduced in the Uu (downlink) to reduce power consumption at the UE. Typically, a UE wakes up every DRX period to decode a physical downlink control (PDCCH). This decoding becomes costly in terms of power consumption if there is no data sent to UE by gNB. To avoid unnecessary DRX wake up for UEs, the gNB transmits a WUS, only when it has data to send to the UE. WUS has one or more of the following characteristics: transmitted across a narrow band (e.g., few subcarriers) and/or low power required to decode the WUS (e.g., sequence based). Accordingly, the UE may consume less power when in a DRX mode by monitoring only the WUS.

As another example of power saving techniques, is the case where a UE wakes up the network. Cell wake up signaling (C-WUS), where a UE transmits WUS to wake up the network, has been introduced recently to conserve power at the network side. In the default scenario, the network configures resources for a UE for transmitting C-WUS. When no C-WUS is detected by a network entity for a cell such as a base station, the network entity only performs synchronization signal block (SSB) transmission, and detection of C-WUS. If the UE detects an SSB indicating a first system information block (SIB1) is not transmitted, UE transmits C-WUS to trigger SIB1 transmission. If the UE detects SSB indicating SIB1 transmission, then UE does not transmit C-WUS and instead just reads the SIB1 information. The network broadcasts status information when active to avoid unnecessary C-WUS transmission from UE, and C-WUS detection by network.

For sidelink or direct link communications, there is no mechanism to wake up another device. Instead, a UE monitors PDCCH, a physical sidelink shared channel (PSSCH) and/or a physical sidelink control channel (PSCCH) during the DRX on duration. In current Uu systems, when a network entity (e.g., base station or gNB) transmits WUS to the UE, the UE does not know the reason why the UE is being woken up. Instead, right after the WUS, there is a connection set up (e.g., radio resource control (RRC) connection) between the UE and the network entity. In contrast, a sidelink WUS cannot operate in the same manner because sidelink or direct link is a distributed system, it is not feasible (per the current standards) to have a connection set up after a sidelink WUS transmission between a first UE and a second UE. For example, when a vehicle UE wakes up a road side unit (RSU), the RSU does not perform connection set up with the vehicle UE after receiving WUS. Hence, there is a need to implicitly indicate the need for waking up the second UE by the first UE via the sidelink wakeup signal (SL-WUS).

In an aspect, the present disclosure provides application specific wake up signals for sidelink systems. An application specific WUS may be transmitted from a first UE to a second UE to wake up the second UE during an on portion of a configured DRX mode. The application specific WUS may be transmitted on configured resources for the second UE. The application specific WUS may indicate a type of information requested by the first UE. For example, the resources selected for the application specific WUS and/or the sequence for the application specific WUS may indicate the type of information. The indication of the type of information may allow the second UE to provide the requested information without a connection setup such as RRC. For example, the type of information may be a reference signal or data from the second UE.

The disclosed application specific wake up signals may provide improvements in power consumption and/or latency in sidelink communications. The use of a wakeup signal for sidelink communications may improve power savings of a DRX mode by allowing the UE configured with the DRX mode to monitor only the configured resources for the WUS, thereby reducing power consumption for decoding control channels. Further, the application-specific nature of the WUS may reduce signaling necessary for communicating the requested information. In some implementations, the timing of the WUS, the sidelink SSB of the second UE, and the transmission of the requested information may be configured for improved latency compared to conventional scheduling of sidelink communications.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

In an aspect, one or more of the UEs 104 may include a SL-WUS transmitting (Tx) component 140 that transmits an applications specific SL-WUS to wake up another UE 104 for sending a requested type of information. The SL-WUS Tx component 140 may include a configuration component 142 configured to determine a sidelink configuration of a second UE that is configured with a discontinuous reception (DRX) mode. In an aspect, the configuration component 142 may receive a configuration from a base station and/or the second UE. The SL-WUS Tx component 140 may optionally include a selection component 144 configured to select of a sequence of the sidelink wake up signal or a configured resource based on a type of information requested by the first UE. The SL-WUS Tx component 140 may include a WUS transmitting component 146 configured to transmits a sidelink wake up signal on a configured resource monitored by the second UE during the DRX mode. The SL-WUS Tx component 140 may include a SL receiving component 148 configured to receive, from the second UE, the type of information requested by the first UE.

Figure 10:
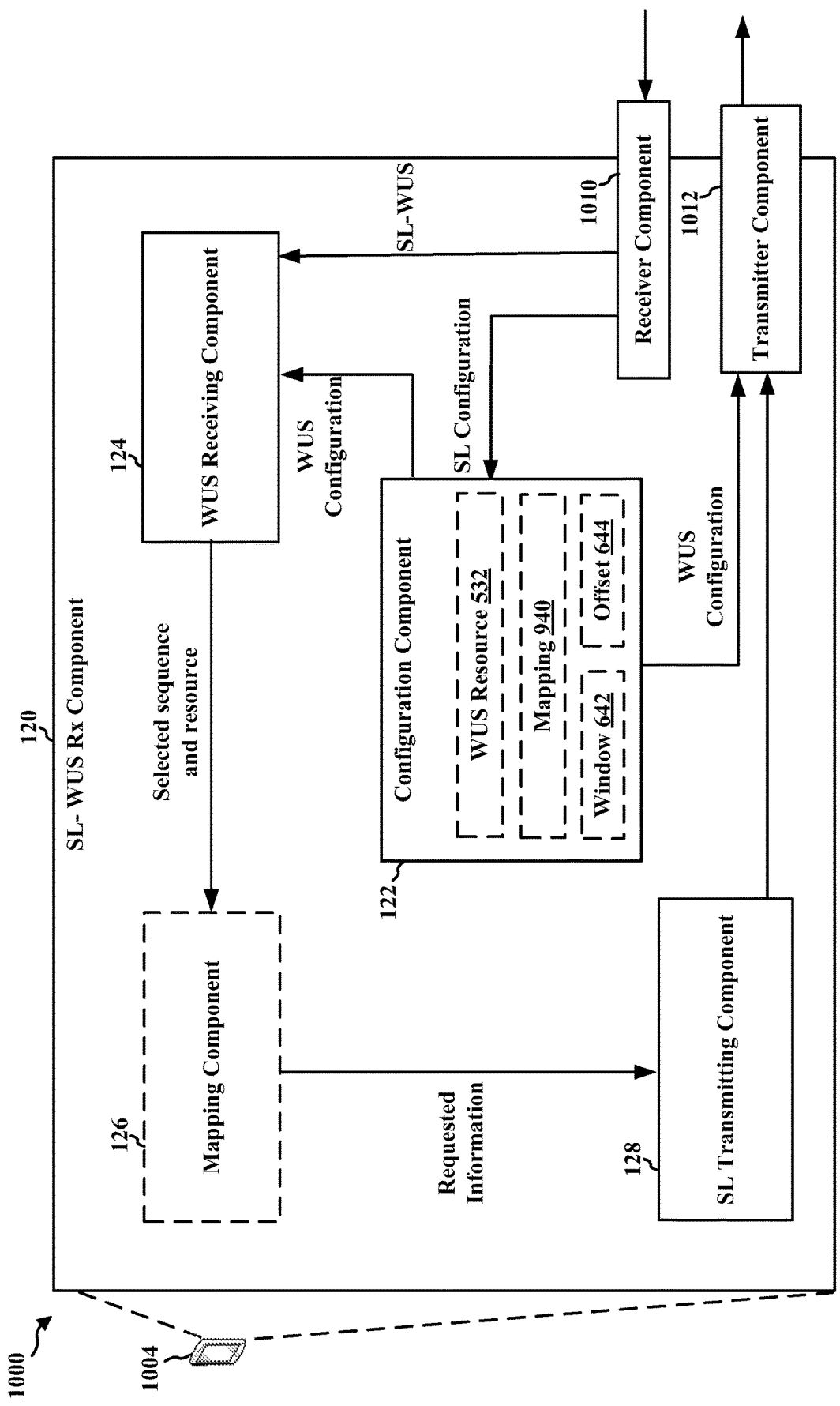
FIG. 10 is a conceptual data flow diagram illustrating the data flow between different means/components in an example UE including a sidelink WUS receiving (Rx) component.

In an aspect, one or more of the UEs 104 (e.g., a second UE) may include a SL-WUS receiving (Rx) component 120 that sends a requested type of information in response to an application specific SL-WUS. It should be appreciated that a UE 104 may include both the SL-WUS Tx component 140 and the SL-WUS Rx component 120. Example components of the SL-WUS Rx component 120 are illustrated in FIG. 10.

The SL-WUS Rx component 120 may include a configuration component 122 configured to determine a sidelink configuration for the second UE 104 including a DRX mode. In an aspect, the configuration component 122 may receive a configuration from a base station (e.g., for the DRX mode). The configuration component 122 may select configuration parameters for the SL-WUS and transmit a WUS configuration. The SL-WUS Rx component 120 may include a WUS receiving component 124 configured to receive, from a first UE, a sidelink wake up signal on a configured resource monitored by the second UE during the DRX mode. The SL-WUS Tx component Rx 120 may optionally include a mapping component 126 configured to map a selection of a sequence of the sidelink wake up signal or a selection of the configured resource to a type of information requested by the first UE. The SL-WUS Rx component 120 includes a SL transmitting component 128 configured to transmit the type of information requested by the first UE.

In an aspect, one or more of the base stations 102 may include a sidelink configuration component 198 that is configured to transmit sideline related system information in response to a cell wake up signal. For example, the sidelink configuration component 198 may be configured to receive a sidelink related cell wake up signal that requests system information for sidelink communication. The sidelink configuration component 198 may be configured to transmit one or more system information blocks that define sidelink communication parameters in response to the sidelink related cell wake up signal.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface), which may be wired or wireless. The base stations 102 configured for 5G NR (collectively referred to as Next Generation RAN (NG-RAN)) may interface with core network 190 through second backhaul links 184, which may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 112 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 112 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR. In an aspect, the D2D communication link 158 may be configured with direct link carrier aggregation for a plurality of component carriers.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency domain duplex (FDD) in which for a particular set of subcarriers (carrier system bandwidth), subframes within the set of subcarriers are dedicated for either DL or UL, or may be time domain duplex (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
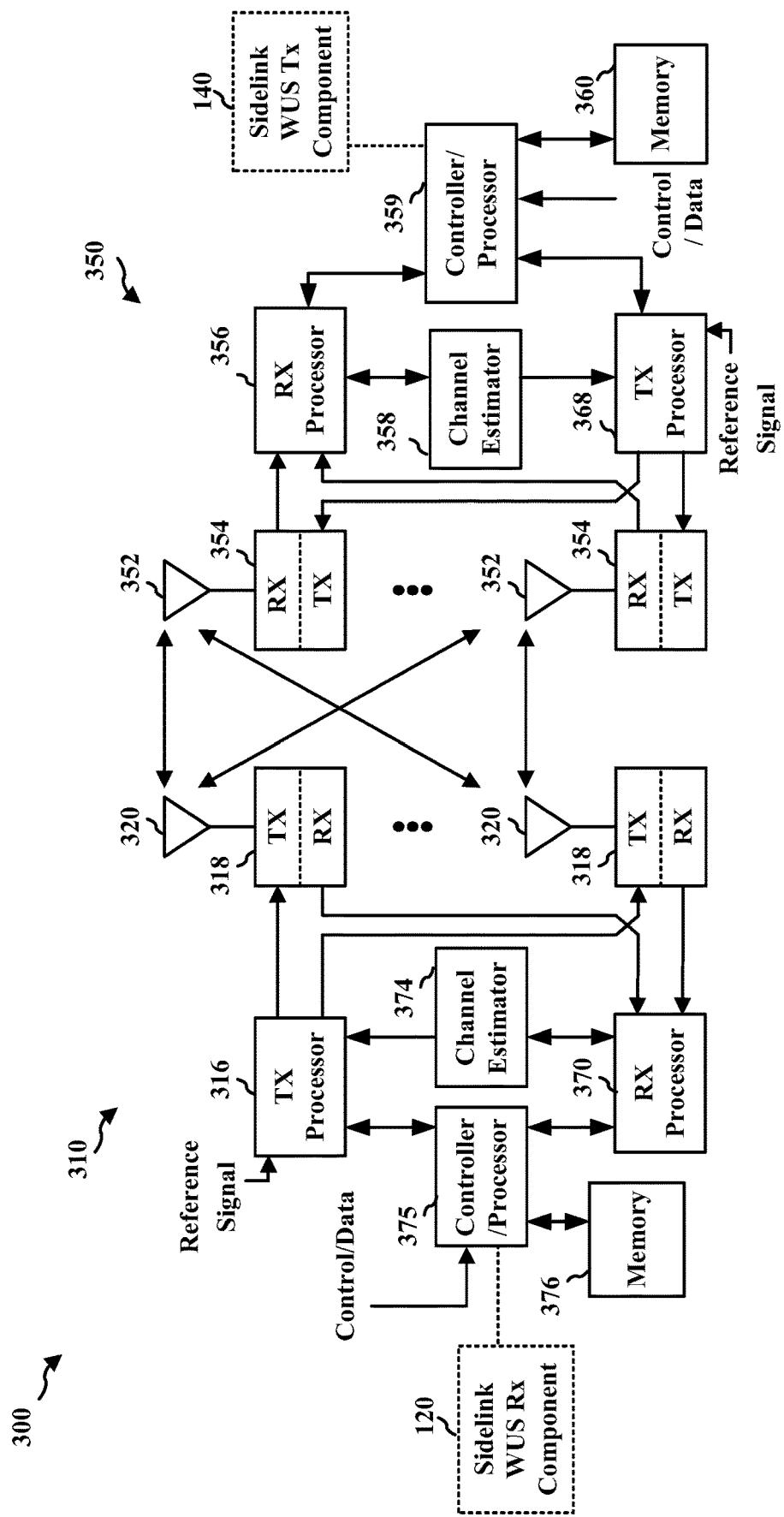
FIG. 3 is a diagram illustrating an example of a base station and user equipment (UE) in an access network.

FIG. 3 is a block diagram 300 of a first wireless communication device 310 in communication with a second wireless communication device 350, e.g., via V2V/V2X/D2D communication. The device 310 may comprise a transmitting device communicating with a receiving device, e.g., device 350, via V2V/V2X/D2D communication. The communication may be based, e.g., on sidelink. The transmitting device 310 may comprise a UE, an RSU, etc. The receiving device may comprise a UE, an RSU, etc. Packets may be provided to a controller/processor 375 that implements layer 3 and layer 2 functionality. Layer 3 includes a RRC layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be coupled with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be coupled with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, and the controller/processor 359 may be configured to perform aspects in connection with the SL-WUS Tx component 140 of FIG. 1.

At least one of the TX processor 316, the RX processor 370, and the controller/processor 375 may be configured to perform aspects in connection with the SL-WUS Rx component 120 of FIG. 1.

Figure 4:
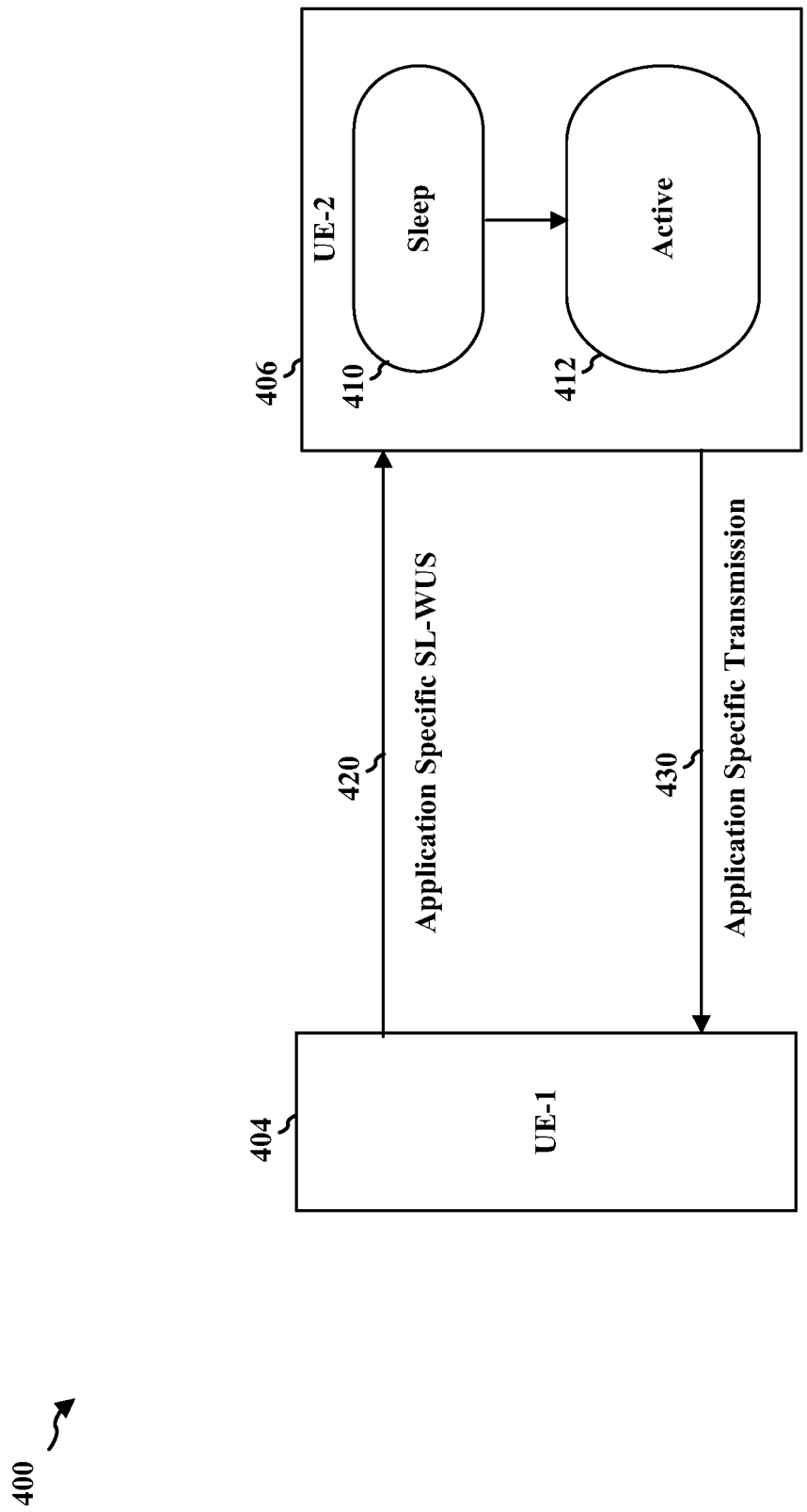
FIG. 4 is a diagram of an example of discontinuous reception (DRX) operation with an application specific WUS for a direct link between a first device and a second device.

FIG. 4 is a diagram 400 illustrating an example of DRX operation with application specific WUS for a direct link between a first device 404 (e.g., a UE 104) and a second device 406 (e.g., another UE such as an RSU or IoT device). Initially, the first device 404 may be awake and the second device 406 may be configured for DRX operation in a sleep state 410. The first device 404 transmits an application specific sidelink (SL) WUS (SL-WUS) 420. The application specific SL-WUS 420 causes the second device 406 to transition from the sleep state to an active state (at least temporarily). While the second device 406 is in the active state 412, the second device 406 can transmit an application specific transmission based on an indication of the application specific SL-WUS 420. Accordingly, the first device 404 may wake up the second device 406 to receive a requested type of information. The WUS configuration may be, for example, preconfigured at the second device 406 or the WUS configuration can be provided by the base station when the second device 406 is in the coverage of the base station.

Figure 5:
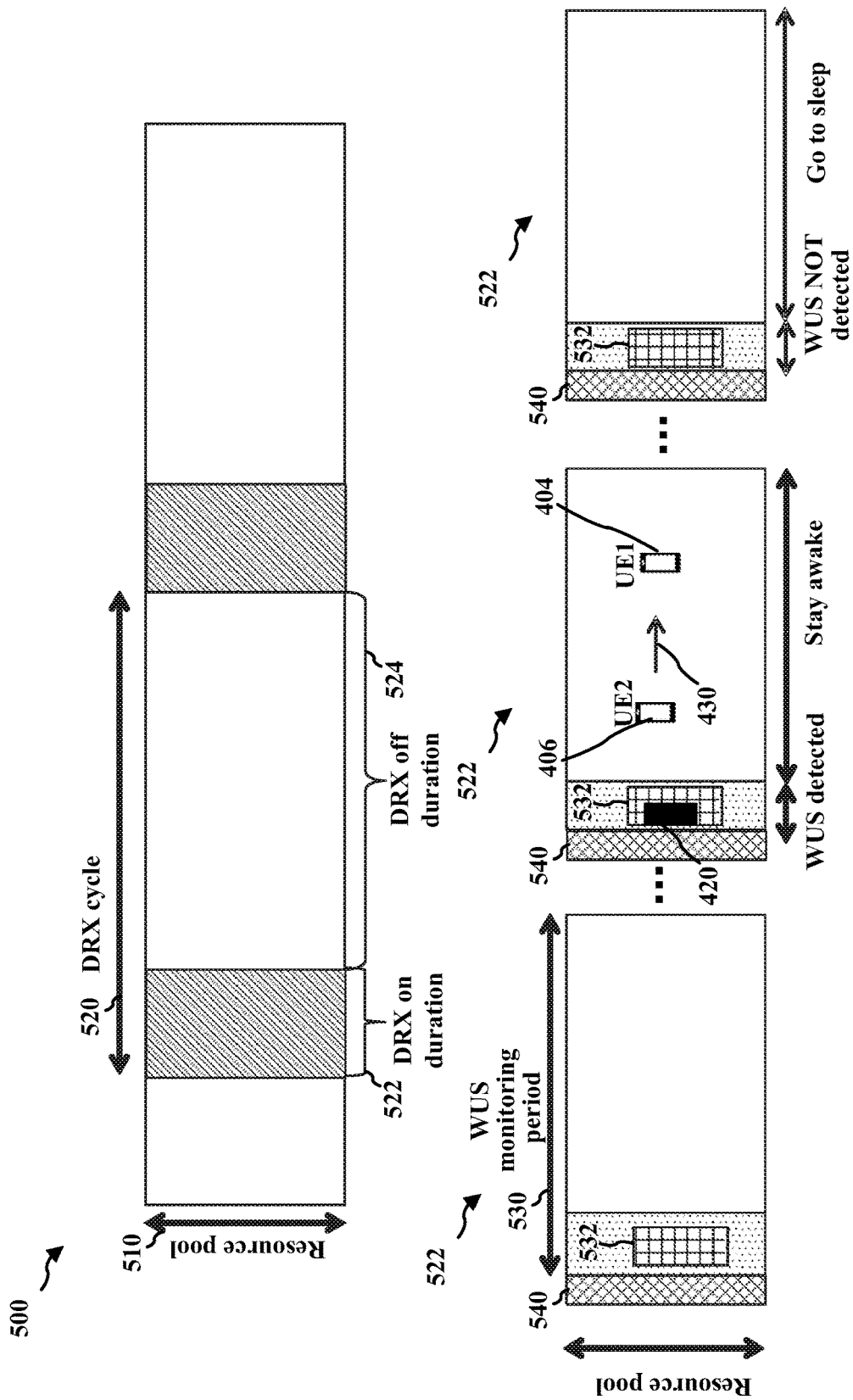
FIG. 5 is a diagram of an example of resources for the DRX operation with application specific WUS between the first device and the second device of FIG. 4.

FIG. 5 is a diagram 500 illustrating an example of resources for DRX operation with application specific WUS for a direct link between the first device 404 and the second device 406. As illustrated, the direct link may provide, for example, unicast communications (i.e., direct communication between UE1 and UE2). Direct link communications may also be applied to other cast types (e.g., group cast and broadcast). For instance, in the broadcast case, UE1 may transmit to all UEs in a vicinity without knowing the identity of each UE. In the frequency domain, the direct link may be over a resource pool 510. In the time domain, a DRX configuration may define a DRX cycle including a DRX on duration 522 and a DRX off duration 524. The DRX configuration may provide for power savings by allowing the UE 104 to sleep during the DRX off duration. In other words, the UE 104 may not monitor direct link control or data channels during the DRX off duration 524.

In an aspect, an application specific WUS operation for a direct link between the first device 404 and the second device 406 may be configured in addition to the DRX operation. The application specific WUS operation may allow the first device 404 to wake up the second device 406 for the second device 406 to transmit requested information to the first device 404. A WUS configuration for the second device 406 may define a WUS monitoring period 530, which may be the same as the DRX cycle 520. That is, the second device 406 may be configured to monitor for a WUS during each DRX on duration 522. The WUS configuration may also define a set of configured WUS resources 532. The set of configured WUS resources 532 may be smaller than the resource pool 510 in frequency width or smaller than the WUS monitoring period 530 in time duration. In some implementations, the WUS resources 532 may be adjacent to or within a slot offset (e.g., 2 or 3 slots) after a slot configured for a sidelink synchronization signal block (S-SSB) 540. The second device 406 may wake up to transmit the S-SSB 540, then switch to monitoring the WUS resources 532.

The second device 406 may monitor the set of configured WUS resources 532 for an application specific SL-WUS 420. If the application specific SL-WUS 420 is detected, the second device 406 may wake up to transmit requested information during the DRX on duration 522, then sleep during the DRX off duration 524 as discussed above. If the SL-WUS 420 is not detected, the second device 406 may sleep for the remainder of the WUS monitoring period 530. That is, the second device 406 may not enter the DRX on duration 522 if the SL-WUS 420 is not detected.

In an aspect, the WUS configuration for the second device 406 may allow the application specific SL-WUS 420 to indicate a type of information requested by the first device 404. For example, the application specific SL-WUS 420 may indicate the type of information requested by the first device 404 via selection of a sequence of the sidelink wake up signal or a selection of the configured resource. For instance, the application specific SL-WUS 420 may be a sequence based transmission, where the first device 404 transmits a configured sequence. The WUS configuration may include multiple sequences corresponding to different types of requested information or a rule that maps sequences to types of information. The sequences may be, for example, orthogonal sequences or may be based on different cyclic shifts applied to a base sequence. In some implementations, the set of configured WUS resources 532 may include different resources capable of carrying the selected sequence. For example, a sequence may be transmitted over one resource block, and the configured WUS resources 532 may include multiple resource blocks over one or more symbols.

In an aspect, the types of information requested by the first device 404 may include a reference signal or data for an application of the second device 406. The reference signal or application data may depend on the type of the second device 406. For example, an RSU may provide reference signals such as a positioning reference signal (PRS) for ranging, a broadcast signal such as a SL-SSB, SL-CSI-RS, or SL-SIB, or data such as sensor information. In some implementations, the first device 404 may request the second device 406 to unicast, broadcast, or groupcast the requested type of information.

The WUS configuration may provide a mapping between sequences and/or resources and available types of information. For example, a first sequence (SL-WUS-Type1) transmitted by the first device 404 in a preconfigured resource may be configured to request non-data related information such as PRS transmission, SLSS, SL-CSIRS etc., from the second device 406. For example, on reception of SL-WUS-Type1 from the first device 404 (e.g., a vehicle UE), the second device 406 (e.g., RSU) may transmit a PRS signal or SLSS to be able to position the first UE. As another example, a second sequence for SL-WUS (SL-WUS-Type2) transmitted by the first device 404 in the preconfigured resource may request data (e.g., sensor related information such as camera, radar in a particular zone/geography from the second device 406, or channel busy ratio in a zone). For example, on reception of SL-WUS-Type2 from the first device 404, the second device 406 may transmit data to the first device 404 to enable enhanced situational awareness.

In other examples, the same sequence transmitted on different resources may indicate different requested types of information. For instance, a fixed sequence SL-WUS transmitted in a first resource may indicate non-data related wake up, while transmission in a second resource indicates data (e.g., sensor information) related SL-WUS. In another example, a fixed sequence SL-WUS transmitted in a third resource may indicate non-data related wake up (e.g., reference signals), to be broadcasted or groupcasted. In another example, a fixed sequence SL-WUS transmitted in a fourth resource may indicate data related wake up, to be groupcasted to a particular group ID.

In some implementations, a mapping between service type and destination ID at a V2X layer (e.g., a provider service identifier (PSID) mapping) may correspond to different SL-WUS sequences and/or resources. For example, sequence1 may map to a SL-WUS signal for a first service type (e.g., non-data related), and sequence2 may map to a SL-WUS signal for a second service type (e.g., data related). In this case, the first device 404 may select the sequence for the sidelink wake up signal based on the mapping, which may be provided in the WUS configuration for the second device 406. In some implementations, the sequence may indicate the destination ID, which may be, for example, a destination Layer-1 ID or a destination Layer-2 ID.

Figure 6:
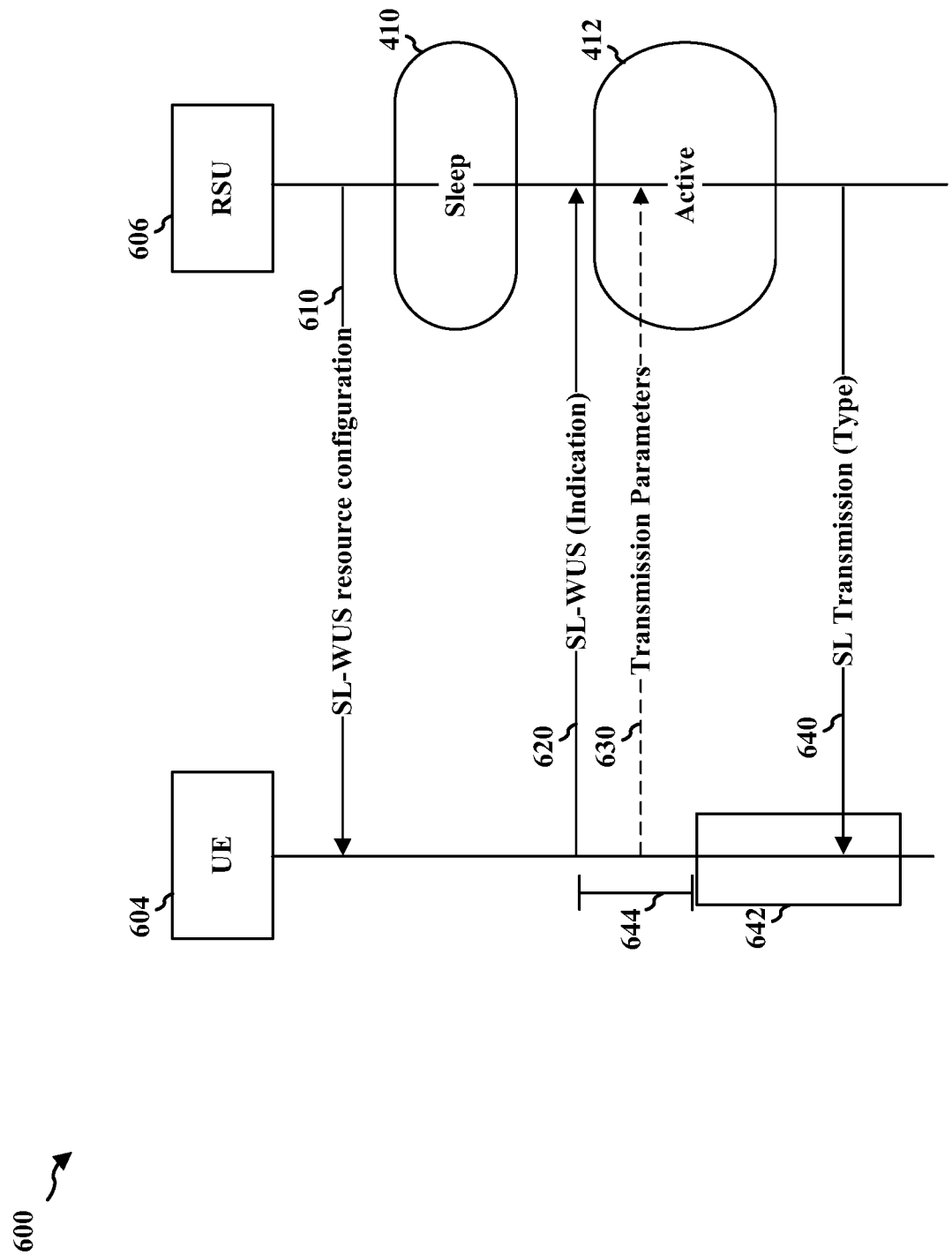
FIG. 6 is a message diagram illustrating example messages between a UE and a road side unit RSU for an example SL-WUS operation.

FIG. 6 is a message diagram 600 illustrating example messages between a UE 604 and a RSU 606 for a SL-WUS operation.

The RSU 606 may provide a SL-WUS resource configuration 610. The SL-WUS resource configuration 610 may indicate the WUS resources 532 and mapping information that maps sequences and/or resources within the WUS resources 532 to different types of information. In some implementations, the SL-WUS resource configuration 610 may be transmitted as sidelink system information (e.g., in SIB19 or SIB21, which include sidelink or V2X related system information). In some implementations, the SL-WUS resource configuration 610 may be provided via RRC signaling. After providing the SL-WUS resource configuration 610, the RSU 606 may enter sleep state 410.

The UE 604 may determine that information from the RSU 606 is needed. Based on the SL-WUS resource configuration 610, the UE 604 may transmit SL-WUS 620. The SL-WUS 620 indicates a type of information requested from the RSU 606, for example, based on the selected resource within the WUS resources 532 or the selected sequence. The RSU 606 may enter the active state 412 in response to the SL-WUS 620. The RSU 606 may transmit a SL transmission 640 of a type based on the indication of the SL-WUS 620. For instance, the RSU 606 may map the selected resource within the WUS resources 532 and/or the selected sequence to a type of information (e.g., associated with a PSID).

In some implementations, timing of a SL transmission 640 from the RSU 606 may be based on the SL-WUS 620. For example, selected resource within the WUS resources 532 or the selected sequence may also indicate a time window 642 for the SL transmission 640. For instance, a duration of the time window 642 and an offset 644 between the SL-WUS 620 and the time window 642 may be associated with the type of information. Similarly, other transmission parameters such as modulation and coding scheme (MCS) may be associated with a type of information (e.g., for data transmissions). Alternatively, in some implementations, timing information or transmission parameters 630 may be separately signaled (e.g., as sidelink control information (SCI)) after the SL-WUS 620 when the RSU 606 is in the active state 412.

Figure 7:
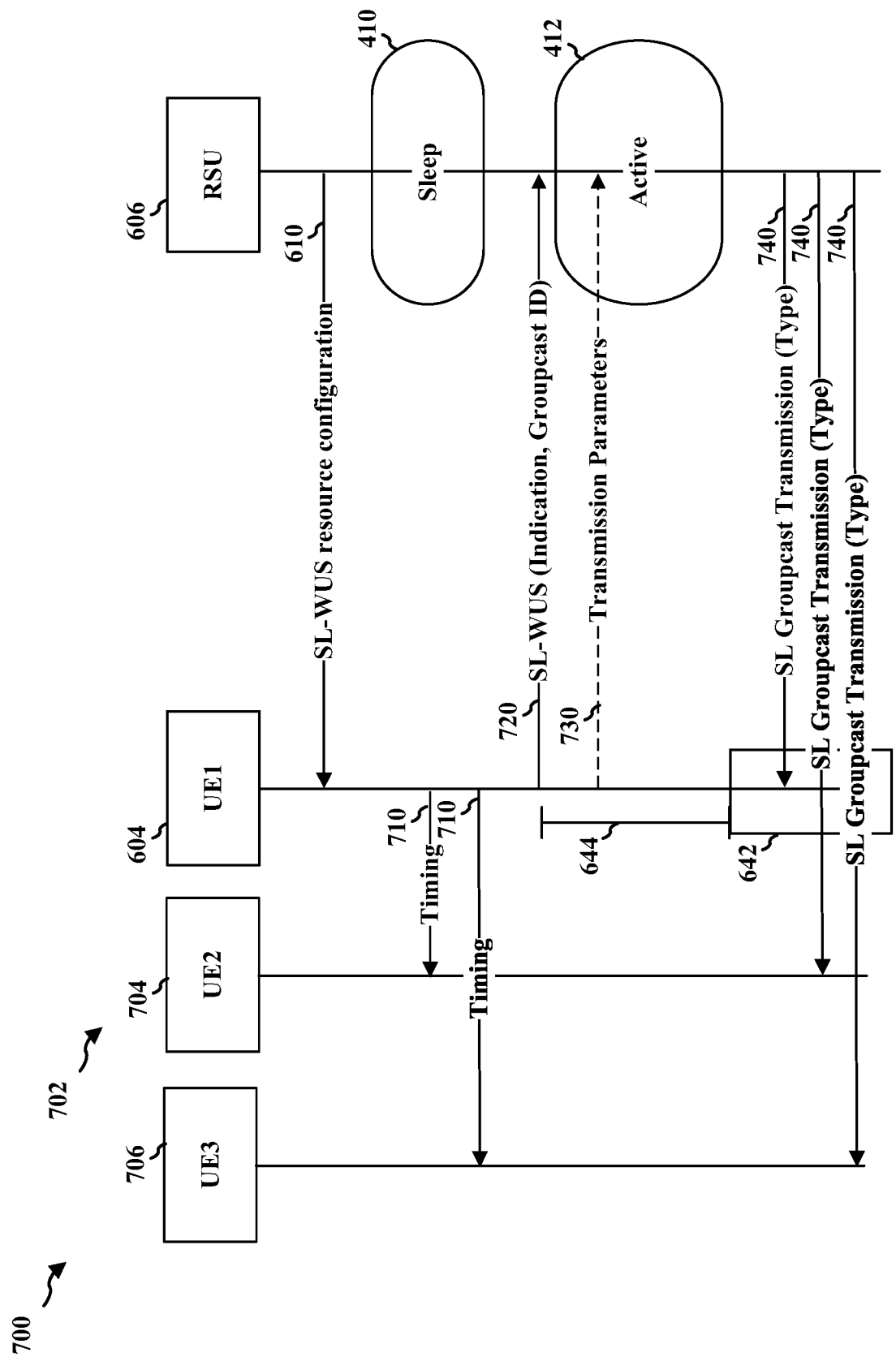
FIG. 7 is a message diagram illustrating example messages between an RSU and a group of UEs for an example SL-WUS operation.

FIG. 7 is a message diagram 700 illustrating example messages between an RSU 606 and a group of UEs 702 including UEs 604, 704, and 706. One of the UEs (e.g., UE 604) may wake up the RSU 606 on behalf of the group of UEs 702. For example, the UE 604 may receive the SL-WUS resource configuration 610 as discussed above. The UE 604 may provide timing information 710 to the other UEs in the group of UEs 702. The timing information 710 may include the duration of the time window 642 and the offset 644. Accordingly, the UEs 704 and 706 may determine when to receive the SL groupcast transmission 740 from the RSU 606.

The UE 604 may transmit a SL-WUS 720 to wake up the RSU 606. The SL-WUS 720 may be similar to the SL-WUS 620, but the SL-WUS 720 may also indicate a groupcast ID for the group of UEs 702. In some implementations, the UE 604 may separately transmit transmission parameters 730, which may include the groupcast ID.

The RSU 606 may transmit the SL groupcast transmission 740 to the group of UEs 702. For example, the SL groupcast transmission 740 may be transmitted with a group radio network temporary identifier (G-RNTI) corresponding to the group of UEs 702.

Figure 8:
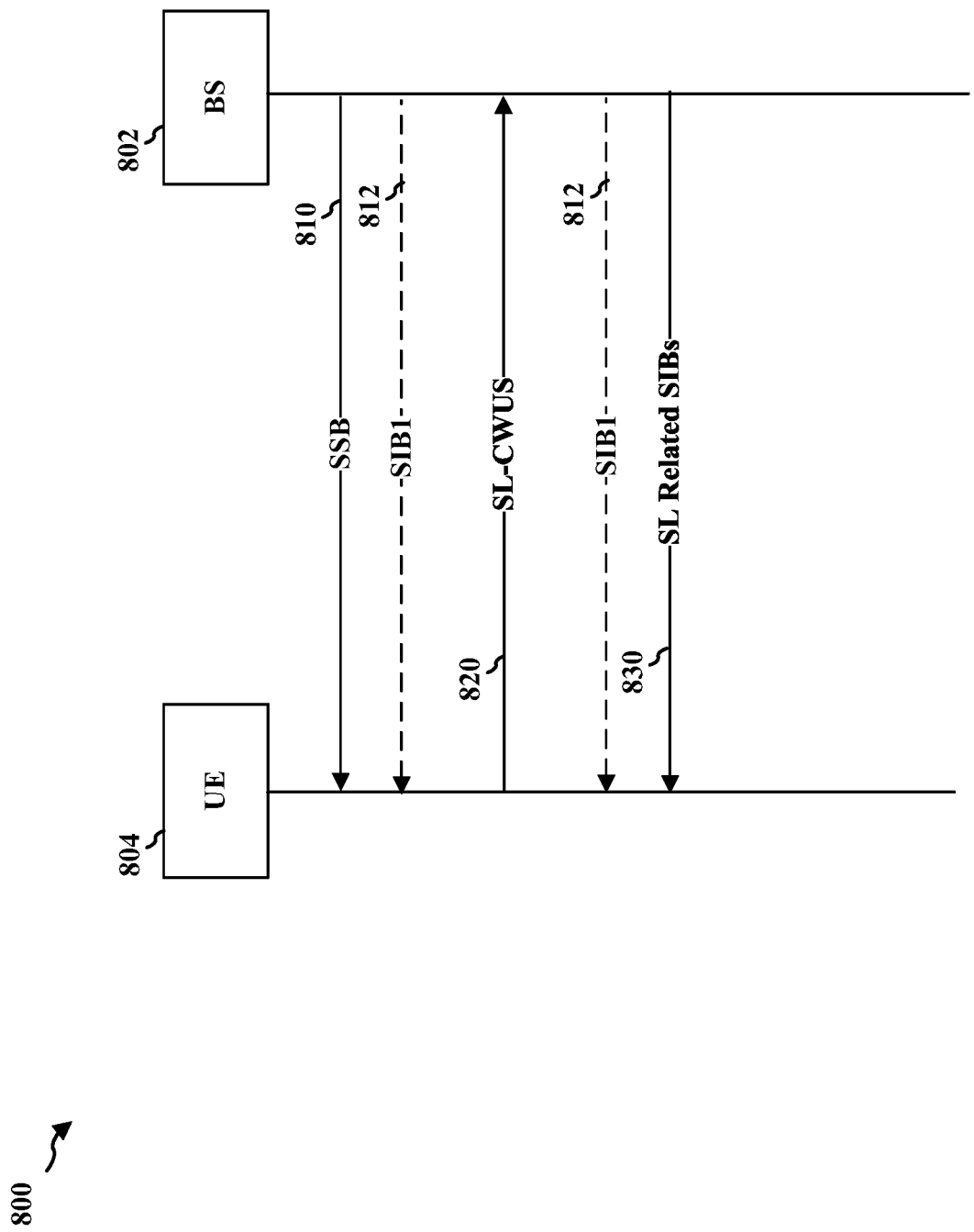
FIG. 8 is a message diagram illustrating example messages between a UE and a base station (BS) for a cell wake up signal for transmitting sidelink related system information.

FIG. 8 is a message diagram 800 illustrating example messages between a UE 604 and a base station (BS) 802 for a cell wake up signal for transmitting sidelink related system information. For example, SIBs 1, 18, 19, and 21 may include information relevant for sidelink communications. In some cases, the BS 802 may enter a sleep state where the BS 802 transmits only an SSB, and optionally transmits SIB1. Even if the BS 802 does not enter a sleep mode, the BS 802 may not transmit some SIBs, or may transmit the SIBs less frequently than desired by a UE. A cell wake up signal may be used to signal the BS 802 to transmit the sidelink related SIBs sooner than the BS 802 otherwise would.

For example, a UE 804 may receive the SSB 810 transmitted by the BS 802 while the BS 802 is in the sleep state. The UE 804 may optionally receive the SIB1 812 while the BS 802 is in the sleep state.

The UE 804 may transmit a SL cell wake up signal (SL-CWUS) 820 to wake up the BS 802. In the case where the BS 802 transmits the SIB1 812 in the sleep mode, the SL-CWUS 820 may be considered a SL dedicated SL-CWUS because only the SL SIBs are requested. In the case where the BS 802 does not transmit the SIB1 812, the SL-CWUS 820 may be considered an integrated or unified CWUS because the SL-CWUS 820 may signal the BS 802 to transmit the SL SIBs as well as SIB1 for Uu interface information.

When the BS 802 receives the SL-CWUS 820, the BS 802 may begin transmission of the SIB1 812 (if not previously transmitted) and SL related SIBS 830. For example, the SL related SIBS 830 may include SIB18, SIB19, and SIB21. The transmission of the SL related SIBS 830 may be based on a master information block (MIB) included in SIB1 812.

Figure 9:
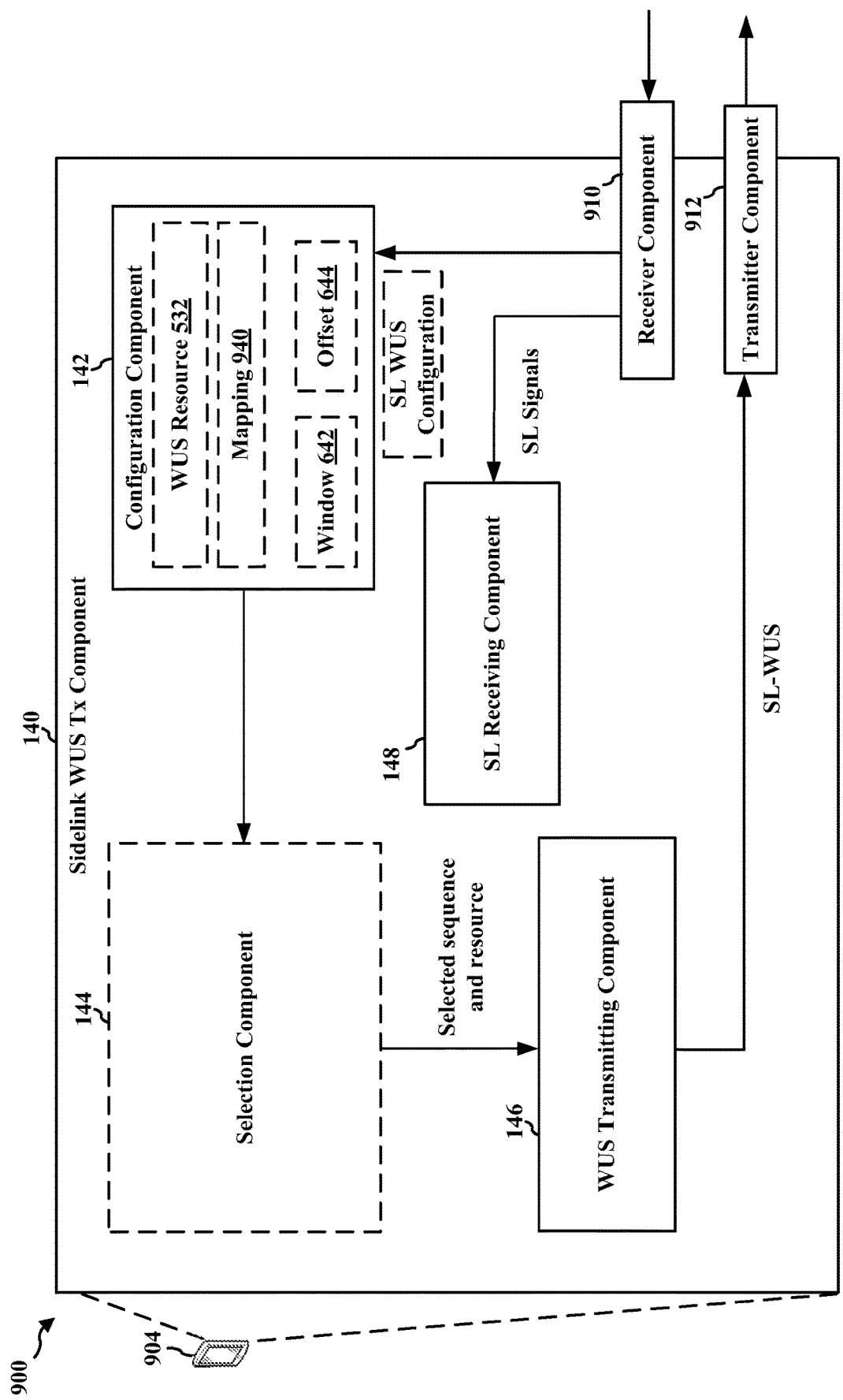
FIG. 9 is a conceptual data flow diagram illustrating the data flow between different means/components in an example UE including a sidelink WUS transmitting (Tx) component.

FIG. 9 is a conceptual data flow diagram 900 illustrating the data flow between different means/components in an example UE 904, which may be an example of the UE 104 including the SL-WUS Tx component 140.

The UE 904 may also include a receiver component 910 and a transmitter component 912. The receiver component 910 may include, for example, a RF receiver for receiving the signals described herein. The transmitter component 912 may include for example, an RF transmitter for transmitting the signals described herein. In some implementations, the receiver component 910 and the transmitter component 912 may be co-located in a transceiver such as the Tx/Rx 354 in FIG. 3.

The receiver component 910 may receive downlink signals or sidelink signals such as the SL-WUS resource configuration 610 and the SL transmissions 640, 740, SSB 810, SIB1 812, and SL related SIBs 830. The receiver component 910 may pass configuration messages to the configuration component 142. The receiver component 910 may pass the sidelink signals to the SL receiving component 148.

The configuration component 142 may receive the SL-WUS resource configuration 610 from the receiver component 910. The configuration component 142 may decode a received configuration to determine SL-WUS parameters. For example, the configuration component 142 may determine the WUS resource 532, the time window 642 and/or the offset 644. In some implementations, the configuration component 142 may identify a mapping 940 that maps the selection of a sequence of the sidelink wake up signal or a selection of the configured resource to a type of information. The mapping 940 may also map the selection of a sequence of the sidelink wake up signal or a selection of the configured resource to a group ID, destination ID, and/or PSID. The configuration component 142 may provide configuration information to the selection component 144 and/or the WUS transmitting component 146.

The selection component 144 may be configured to receive the WUS configuration information from the configuration component 142. In some implementations, the selection component 144 may receive an identification of a second UE and type of information from a higher layer application. For example, in a vehicle UE, a navigation application may request sensor data from an RSU. The selection component 144 may receive the sidelink signals from the receiver component 910. The selection component 144 may select of a sequence of the sidelink wake up signal or the configured WUS resource based on a type of information requested by the first UE (e.g., the higher layer application). The selection component 144 may provide the selected sequence and WUS resource to the WUS transmitting component 146.

The WUS transmitting component 146 may receive the selected sequence and WUS resource from the selection component 144. The WUS transmitting component 146 may be configured to transmit a sidelink wake up signal (e.g., application specific SL-WUS 420) on a configured resource (e.g., WUS resource 532) monitored by the second UE during the DRX mode. The WUS transmitting component 146 may transmit the sidelink wake up signal via the transmitter component 912.

The SL receiving component 148 may receive SL signals from the receiver component 910. In particular, the SL receiving component 148 is configured to receive the type of information requested by the first UE from the second UE. For example, the SL receiving component 148 may receive the requested information (e.g., SL transmission 640) in the time window 642. In some implementations, the SL receiving component 148 receives the SL transmission 640 based on transmission parameters implied by the application specific SL-WUS 420.

FIG. 10 is a conceptual data flow diagram 1000 illustrating the data flow between different means/components in an example UE 1004, which may be an example of the UE 104 including the SL-WUS Rx component 120. In some implementations, the example UE 1004 may also include a SL-WUS Tx component 140.

The UE 1004 also may include a receiver component 910 and a transmitter component 1012. The receiver component 1010 may include, for example, a RF receiver for receiving the signals described herein. The transmitter component 1012 may include, for example, an RF transmitter for transmitting the signals described herein. In some implementations, the receiver component 1010 and the transmitter component 1012 may be co-located in a transceiver such as the Tx/Rx 318 in FIG. 3. In implementations where the UE 1004 includes a SL-WUS Tx component 140, the receiver component 910 and receiver component 1010 may be the same, and the transmitter component 912 and transmitter component 1012 may be the same.

The receiver component 1010 may receive downlink signals or sidelink signals such as the SL-WUS 420, SSB 810, SIB1 812, and SL related SIBs 830. The receiver component 910 may pass system information to the configuration component 122. The receiver component 1010 may pass the SL-WUS 420 to the WUS receiving component 124.

The configuration component 122 may receive sidelink configuration information from the receiver component 1010. For example, the sidelink configuration information may include the sidelink related SIBs 830. In some implementations, the configuration component 122 may receive a DRX configuration from a base station. The configuration component 122 may determine SL-WUS parameters. For example, the configuration component 122 may determine the WUS resource 532, the time window 642 and/or the offset 644. In some implementations, the configuration component 142 may generate a mapping 940 that maps the selection of a sequence of the sidelink wake up signal or a selection of the configured resource to a type of information. The mapping 940 may also map the selection of a sequence of the sidelink wake up signal or a selection of the configured resource to a group ID, destination ID, and/or PSID. The configuration component 122 may provide a WUS configuration to the WUS receiving component 124. The configuration component 122 may transmit the SL-WUS resource configuration 610 via the transmitter component 1012.

The WUS receiving component 124 may receive the WUS configuration from the configuration component 122. The WUS receiving component 124 may be configured to receive the SL-WUS 420 via the receiver component 1010. The WUS receiving component 124 may wake up the UE 1004 in response to the SL-WUS 420. The WUS receiving component 124 may identify the selected sequence and the selected resource of the SL-WUS 420. The WUS receiving component 124 may provide the selected sequence and the selected resource to the mapping component 126 and/or the SL transmitting component 128.

The mapping component 126 may receive the selected sequence and the selected resource from the WUS receiving component 124. The mapping component 126 may be configured to map a selection of a sequence of the sidelink wake up signal or a selection of the configured resource to a type of information requested by the first UE. For example, the mapping component 126 may map, at a V2X layer, a destination ID of the sidelink wake up signal to a sidelink process identifier (PSID). The mapping component 126 may obtain the requested information from a higher layer application. For instance, in an RSU, the mapping component 126 may obtain sensor information. The mapping component 126 may provide the requested information to the SL transmitting component 128.

The SL transmitting component 128 may receive the requested information from the mapping component 126. In some implementations, the SL transmitting component may receive transmission parameters from the configuration component 122. The SL transmitting component 128 is configured to transmit the type of information requested by the first UE. For example, the SL transmitting component 128 may transmit the requested information during the time window 642. In some implementations, where the SL-WUS indicates a group ID, the SL transmitting component 128 may transmit the requested information as a SL groupcast transmission 740.

Figure 11:
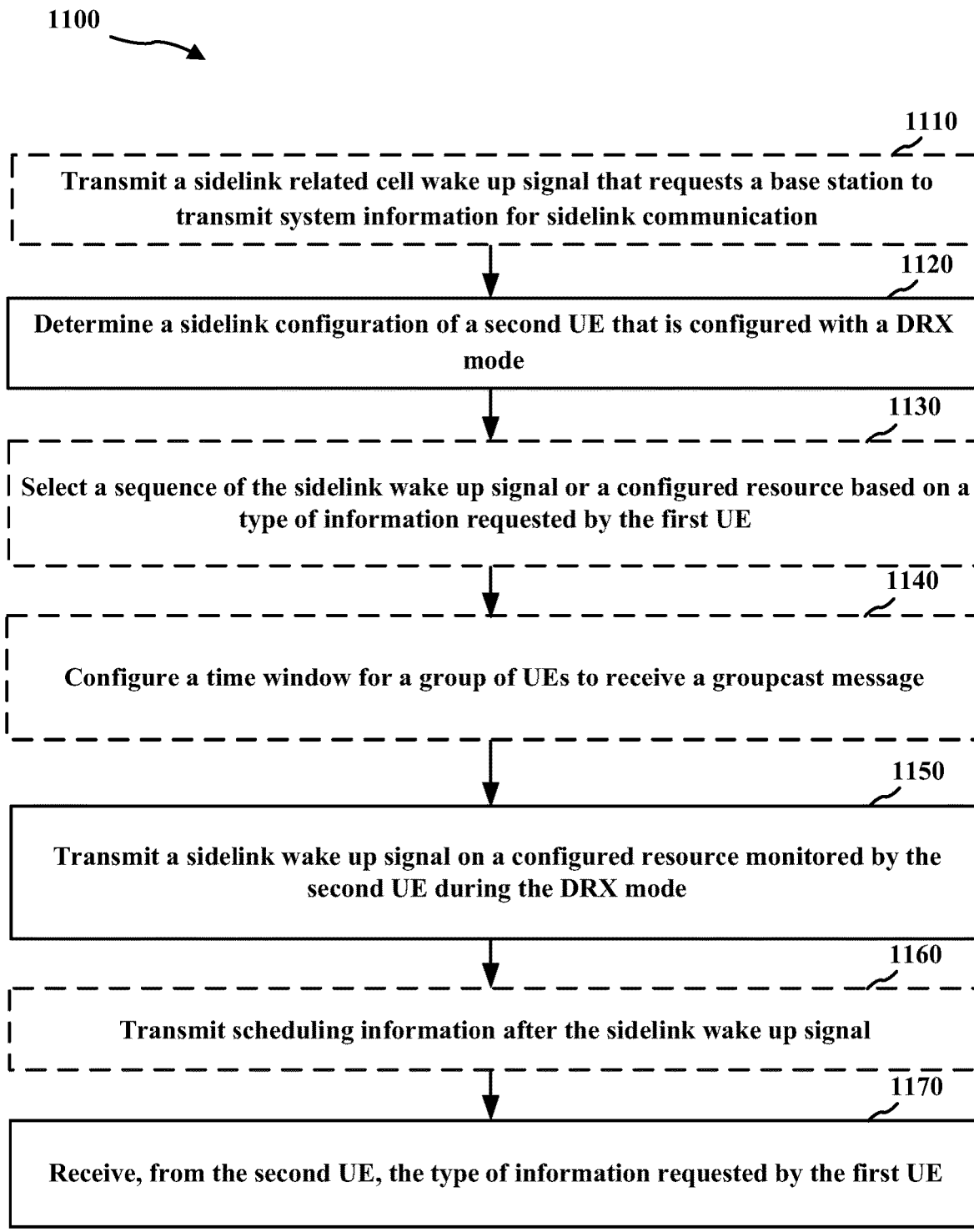
FIG. 11 is a flowchart of an example method for operating a UE for requesting information with an application specific SL-WUS.

FIG. 11 is a flowchart of an example method 1100 for operating a UE 104 (e.g., the first UE 104) for requesting information with an application specific SL-WUS. The method 1100 may be performed by a UE (such as the UE 104, which may include the memory 360 and which may be the entire UE 104 or a component of the UE 104 such as the SL-WUS Tx component 140, the TX processor 368, the RX processor 356, or the controller/processor 359). The method 1100 may be performed by the SL-WUS Tx component 140 in communication with the SL-WUS Rx component 120 of a second UE 104.

At block 1110, the method 1100 may optionally include transmitting a sidelink related cell wake up signal that requests a base station to transmit system information for sidelink communication. In an aspect, for example, the UE 104, the TX processor 368 and/or the controller/processor 359 may execute the SL-WUS Tx component 140, the transmitter component 912, and/or the configuration component 142 to transmit a sidelink related cell wake up signal (e.g., SL-CWUS 820) that requests a base station to transmit system information (e.g., SL related SIBS 830) for sidelink communication. Accordingly, the UE 104, the TX processor 368 and/or the controller/processor 359 executing the SL-WUS Tx component 140, the transmitter component 912, and/or the configuration component 142 may provide means for transmitting a sidelink related cell wake up signal that requests a base station to transmit system information for sidelink communication.

At block 1120, the method 1100 includes determining a sidelink configuration of a second UE that is configured with a DRX mode. In an aspect, for example, the UE 104, the RX processor 356 and/or the controller/processor 359 may execute the SL-WUS Tx component 140 and/or the configuration component 142 to determine a sidelink configuration of a second UE that is configured with a DRX mode. Accordingly, the UE 104, the RX processor 356, and/or the controller/processor 359 executing the SL-WUS Tx component 140 and/or the configuration component 142 may provide means for determining a sidelink configuration of a second UE that is configured with a DRX mode.

At block 1130, the method 1100 may optionally include selecting a sequence of the sidelink wake up signal or a configured resource based on a type of information requested by the first UE. In an aspect, for example, the UE 104, the TX processor 368 and/or the controller/processor 359 may execute the SL-WUS Tx component 140 and/or the selection component 144 to select a sequence of the sidelink wake up signal (e.g., SL-WUS 420) or a configured resource based on a type of information requested by the first UE. For example, in some implementations, selection of a first sequence indicates a request for a reference signal or sidelink synchronization signal and selection of a second sequence indicates a request for data. In another example, a sequence on a first configured resource indicates a request for a reference signal and the sequence on a second configured resource indicates a request for data. In a third example, the selection of the sequence for the sidelink wake up signal is based on a mapping from a provider service identifier (PSID) to a destination ID at a V2X layer. The sidelink wake up signal can carry the destination ID. Accordingly, the UE 104, the TX processor 368 and/or the controller/processor 359 executing the SL-WUS Tx component 140, the transmitter component 912, and/or the configuration component 142 may provide means for selecting a sequence of the sidelink wake up signal or a configured resource based on a type of information requested by the first UE.

At block 1140, the method 1100 may optionally include configuring a time window for a group of UEs to receive a groupcast message. In an aspect, for example, the UE 104, the TX processor 368 and/or the controller/processor 359 may execute the SL-WUS Tx component 140 and/or the configuration component 142 to configure a time window 642 for a group of UEs 702 to receive a groupcast message (e.g., SL groupcast transmission 740). For example, the configuration component 142 may transmit timing information 710 to UEs 704 and 706. Accordingly, the UE 104, the TX processor 368 and/or the controller/processor 359 executing the SL-WUS Tx component 140, the transmitter component 912, and/or the configuration component 142 may provide means for configuring a time window for a group of UEs to receive a groupcast message.

At block 1150, the method 1100 includes transmitting a sidelink wake up signal on a configured resource monitored by the second UE during the DRX mode. In an aspect, for example, the UE 104, the TX processor 368 and/or the controller/processor 359 may execute the SL-WUS Tx component 140 and/or the WUS transmitting component 146 to transmit a sidelink wake up signal on a configured resource monitored by the second UE during the DRX mode. In some implementations, the sidelink wake up signal implies a time window 642 during which the first UE receives the type of information requested by the first UE. In some implementations, the sidelink wake up signal implies a parameter of a data transmission. In some implementations, the sidelink wake up signal includes a groupcast identifier on a configured resource that indicates a type of information for the group of UEs. In some implementations, the configured resource 532 monitored by the second UE during a DRX mode is within a slot offset after a slot configured for a S-SSB 540 of the second UE. Accordingly, the UE 104, the TX processor 368 and/or the controller/processor 359 executing the SL-WUS Tx component 140 and/or the WUS transmitting component 146 may provide means for transmitting a sidelink wake up signal on a configured resource monitored by the second UE during the DRX mode.

At block 1160, the method 1100 may optionally include transmitting scheduling information after the sidelink wake up signal. In an aspect, for example, the UE 104, the TX processor 368 and/or the controller/processor 359 may execute the SL-WUS Tx component 140 and/or the configuration component 142 to transmit scheduling information after the sidelink wake up signal. For example, the configuration component 142 may transmit transmission parameters 630 to the second UE (e.g., second device 406 or RSU 606). For instance, the configuration component 142 may transmit a SCI including the transmission parameters 630. Accordingly, the UE 104, the TX processor 368 and/or the controller/processor 359 executing the SL-WUS Tx component 140, the transmitter component 912, and/or the configuration component 142 may provide means for transmitting scheduling information after the sidelink wake up signal.

At block 1170, the method 1100 includes receiving, from the second UE, the type of information requested by the first UE. In an aspect, for example, the UE 104, the RX processor 356 and/or the controller/processor 359 may execute the SL-WUS Tx component 140 and/or the SL receiving component 148 to receive, from the second UE (e.g., second device 406 or RSU 606), the type of information requested by the first UE. For example, the SL receiving component 148 may receive the application specific transmission 430, the SL transmission 640, or the SL groupcast transmission 740. For example, where the sidelink wake up signal is on behalf of a group of UEs, the type of information requested by the first UE is received via a groupcast message. Accordingly, the UE 104, the RX processor 356, and/or the controller/processor 359 executing the SL-WUS Tx component 140 and/or the SL receiving component 148 may provide means for receiving, from the second UE, the type of information requested by the first UE.

Figure 12:
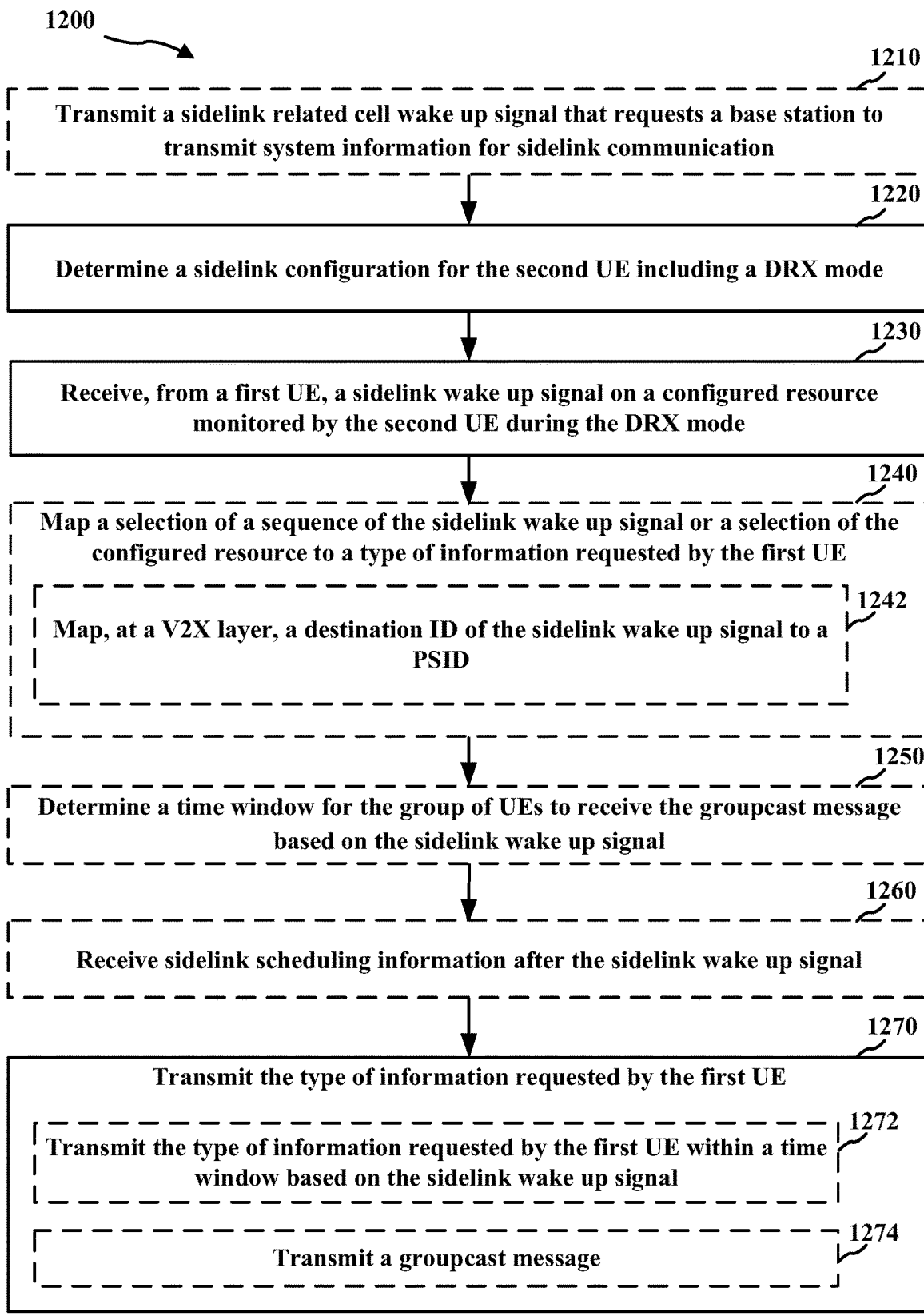
FIG. 12 is a flowchart of an example method for operating a UE for transmitting information in response to an application specific SL-WUS.

FIG. 12 is a flowchart of an example method 1200 for operating a second UE 104 (e.g., the second device 406 or RSU 606) for transmitting information in response to an application specific SL-WUS. The method 1200 may be performed by a UE (such as the UE 104, which may include the memory 360 and which may be the entire UE 104 or a component of the UE 104 such as the SL-WUS Rx component 120, the TX processor 368, the RX processor 356, or the controller/processor 359). The method 1200 may be performed by the SL-WUS Rx component 120 in communication with the SL-WUS Tx component 140 of another UE 104.

At block 1210, the method 1200 may optionally include transmitting a sidelink related cell wake up signal that requests a base station to transmit system information for sidelink communication. In an aspect, for example, the UE 104, the TX processor 316 and/or the controller/processor 375 may execute the SL-WUS Rx component 120, the transmitter component 1012, and/or the configuration component 122 to transmit a sidelink related cell wake up signal (e.g., SL-CWUS 820) that requests a base station to transmit system information (e.g., SL related SIBS 830) for sidelink communication. Accordingly, the UE 104, the TX processor 316 and/or the controller/processor 375 executing the SL-WUS Rx component 120, the transmitter component 1012, and/or the configuration component 122 may provide means for transmitting a sidelink related cell wake up signal that requests a base station to transmit system information for sidelink communication.

At block 1220, the method 1200 includes determining a sidelink configuration for the second UE including a DRX mode. In an aspect, for example, the UE 104, the TX processor 316 and/or the controller/processor 375 may execute the SL-WUS Rx component 120 and/or the configuration component 122 to determine a sidelink configuration for the second UE including a DRX mode. For example, the configuration component 122 may receive sidelink system information in the SL related SIBs 830. In some implementations, the configuration component 122 may receive a sidelink configuration from the base station 802 (e.g., via RRC signaling). In some implementations, the configuration component 122 may autonomously select sidelink configuration parameters. In some implementations, the configuration component 122 may transmit the sidelink configuration via sidelink system information blocks. Accordingly, the UE 104, the TX processor 316 and/or the controller/processor 375 executing the SL-WUS Rx component 120 and/or the configuration component 122 may provide means for determining a sidelink configuration for the second UE including a DRX mode.

At block 1230, the method 1200 includes receiving, from a first UE, a sidelink wake up signal on a configured resource monitored by the second UE during the DRX mode. In an aspect, for example, the UE 104, the RX processor 356 and/or the controller/processor 359 may execute the SL-WUS Rx component 120 and/or the WUS receiving component 124 to receive, from a first UE, a sidelink wake up signal on a configured resource monitored by the second UE during the DRX mode. In some implementations, the sidelink wake up signal implies a parameter of a data transmission. In view of the foregoing, the UE 104, the RX processor 356, and/or the controller/processor 359 executing the SL-WUS Rx component 120 and/or the WUS receiving component 124 may provide means for receiving, from a first UE, a sidelink wake up signal on a configured resource monitored by the second UE during the DRX mode.

At block 1240, the method 1200 includes mapping a selection of a sequence of the sidelink wake up signal or a selection of the configured resource to a type of information requested by the first UE. In an aspect, for example, the UE 104, the RX processor 356 and/or the controller/processor 359 may execute the SL-WUS Rx component 120 and/or the mapping component 126 to map a selection of a sequence of the sidelink wake up signal or a selection of the configured resource to a type of information requested by the first UE. For example, at sub-block 1242, the block 1240 may include mapping, at a V2X layer, a destination ID of the sidelink wake up signal to a sidelink PSID. The sidelink wake up signal may carry (i.e., indicate) the destination ID. For example, the mapping component 126 may map the selection of a sequence of the sidelink wake up signal or the selection of the configured resource based on the mapping 940. In some implementations, selection of a first sequence indicates a request for a reference signal or sidelink synchronization signal and selection of a second sequence indicates a request for data. In some implementations, a sequence on a first configured resource indicates a request for a reference signal and the sequence on a second configured resource indicates a request for data. In view of the foregoing, the UE 104, the RX processor 356, and/or the controller/processor 359 executing the SL-WUS Rx component 120 and/or the mapping component 126 may provide means for mapping a selection of a sequence of the sidelink wake up signal or a selection of the configured resource to a type of information requested by the first UE.

At block 1250, the method 1200 may optionally include determining a time window for the group of UEs to receive the groupcast message based on the sidelink wake up signal. In an aspect, for example, the UE 104, the RX processor 356 and/or the controller/processor 359 may execute the SL-WUS Rx component 120 and/or the mapping component 126 to determine a time window 642 for the group of UEs 702 to receive the groupcast message (e.g., SL groupcast transmission 740) based on the sidelink wake up signal (e.g., SL-WUS 720). For instance, the mapping 940 may map the groupcast ID to the time window 642. In view of the foregoing, the UE 104, the RX processor 356, and/or the controller/processor 359 executing the SL-WUS Rx component 120 and/or the mapping component 126 may provide means for determining a time window for the group of UEs to receive the groupcast message based on the sidelink wake up signal.

At block 1260, the method 1200 may optionally include receiving sidelink scheduling information after the sidelink wake up signal. In an aspect, for example, the UE 104, the RX processor 356 and/or the controller/processor 359 may execute the SL-WUS Rx component 120 and/or the configuration component 142 to receive sidelink scheduling information (e.g., transmission parameters 630, 730) after the sidelink wake up signal. In view of the foregoing, the UE 104, the RX processor 356, and/or the controller/processor 359 executing the SL-WUS Rx component 120 and/or the configuration component 122 may provide means for receiving sidelink scheduling information after the sidelink wake up signal.

At block 1270, the method 1200 may optionally include transmitting the type of information requested by the first UE. In an aspect, for example, the UE 104, the TX processor 316 and/or the controller/processor 375 may execute the SL-WUS Rx component 120, the transmitter component 1012, and/or the SL transmitting component 128 to transmit the type of information requested by the first UE. For example, at sub-block 1272, the block 1270 may optionally include transmitting the type of information requested by the first UE within a time window 642 based on the sidelink wake up signal. In some implementations, at sub-block 1274, the block 1270 may optionally include transmitting a groupcast message (e.g., SL groupcast transmission 740), for example, (when the sidelink wake up signal is on behalf of a group of UEs 702. Accordingly, the UE 104, the TX processor 316 and/or the controller/processor 375 executing the SL-WUS Rx component 120, the transmitter component 1012, and/or the SL transmitting component 128 may provide means for transmitting the type of information requested by the first UE.

SOME FURTHER EXAMPLE CLAUSES

Implementation examples are described in the following numbered clauses:

1. A method of wireless communication for a first user equipment (UE), comprising:
   determining a sidelink configuration of a second UE that is configured with a discontinuous reception (DRX) mode;
   transmitting a sidelink wake up signal on a configured resource monitored by the second UE during the DRX mode, wherein a selection of a sequence of the sidelink wake up signal or a selection of the configured resource indicates a type of information requested by the first UE; and
   receiving, from the second UE, the type of information requested by the first UE.

2. The method of clause 1, wherein selection of a first sequence indicates a request for a reference signal or sidelink synchronization signal and selection of a second sequence indicates a request for data.

3. The method of clause 1, wherein a sequence on a first configured resource indicates a request for a reference signal and the sequence on a second configured resource indicates a request for data.

4. The method of clause 1, wherein the selection of the sequence for the sidelink wake up signal is based on a mapping from a provider service identifier (PSID) to a destination ID at a vehicle to anything (V2X) layer.

5. The method of clause 4, wherein the sidelink wake up signal carries the destination ID.

6. The method of any of clauses 1-5, wherein the sidelink wake up signal implies a time window during which the first UE receives the type of information requested by the first UE.

7. The method of any of clauses 1-6, wherein the sidelink wake up signal implies a parameter of a data transmission.

8. The method of any of clauses 1-7, further comprising transmitting scheduling information after the sidelink wake up signal.

9. The method of any of clauses 1-8, wherein the sidelink wake up signal is on behalf of a group of UEs, wherein the type of information requested by the first UE is received via a groupcast message.

10. The method of clause 9, further comprising configuring a time window for the group of UEs to receive the groupcast message.

11. The method of clause 9 or 10, wherein the sidelink wake up signal includes a groupcast identifier on a configured resource that indicates a type of information for the group of UEs.

12. The method of any of clauses 1-11, wherein the configured resource monitored by the second UE during a DRX mode is within a slot offset after a slot configured for a sidelink synchronization signal block (S-SSB) of the second UE.

13. The method of any of clauses 1-12, further comprising transmitting a sidelink related cell wake up signal that requests a base station to transmit system information for sidelink communication.

14. An apparatus of a first user equipment (UE), comprising:
   a memory storing computer-executable instructions; and
   at least one processor coupled with the memory and configured to execute the computer-executable instructions to cause the first UE to perform the method of any of clauses 1-13.

15. An apparatus of a first user equipment (UE), comprising means for performing the method of any of clauses 1-13.

16. A non-transitory computer-readable medium storing computer executable code, the code when executed by a processor of a first user equipment (UE) causes the first UE to perform the method of any of clauses 1-13.

17. A method of wireless communication for a second user equipment (UE), comprising:
   determining a sidelink configuration for the second UE including a discontinuous reception (DRX) mode;
   receiving, from a first UE, a sidelink wake up signal on a configured resource monitored by the second UE during the DRX mode, wherein selection of a sequence of the sidelink wake up signal or a selection of the configured resource indicates a type of information requested by the first UE; and
   transmitting the type of information requested by the first UE.

18. The method of clause 17, wherein selection of a first sequence indicates a request for a reference signal or sidelink synchronization signal and selection of a second sequence indicates a request for data.

19. The method of clause 17, wherein a sequence on a first configured resource indicates a request for a reference signal and the sequence on a second configured resource indicates a request for data.

20. The method of clause 17, further comprising mapping, at a vehicle to anything (V2X) layer, a destination ID of the sidelink wake up signal to a sidelink provider service identifier (PSID).

21. The method of clause 20, wherein the sidelink wake up signal carries the destination ID.

22. The method of any of clauses 17-21, wherein transmitting the type of information requested by the first UE comprises transmitting the type of information requested by the first UE within a time window based on the sidelink wake up signal.

23. The method of any of clauses 17-22, wherein the sidelink wake up signal implies a parameter of a data transmission.

24. The method of any of clauses 17-23, further comprising receiving sidelink scheduling information after the sidelink wake up signal.

25. The method of any of clauses 17-24, wherein the sidelink wake up signal is on behalf of a group of UEs, wherein transmitting the type of information requested by the first UE comprises transmitting a groupcast message.

26. The method of clause 25, further comprising determining a time window for the group of UEs to receive the groupcast message based on the sidelink wake up signal.

27. The method of clause 25 or 26, wherein the sidelink wake up signal includes a groupcast identifier on a configured resource that indicates a type of information for the group of UEs.

28. The method of any of clauses 17-27, wherein the configured resource monitored by the second UE during a DRX mode is within a slot offset after a slot configured for a sidelink synchronization signal block (S-SSB) of the second UE.

29. An apparatus of a second user equipment (UE), comprising:
a memory storing computer-executable instructions; and
at least one processor coupled with the memory and configured to execute the computer-executable instructions to cause the second UE to perform the method of any of clauses 17-28.

30. An apparatus of a first user equipment (UE), comprising means for performing the method of any of clauses 17-28.

31. A non-transitory computer-readable medium storing computer executable code, the code when executed by a processor of a first user equipment (UE) causes the first UE to perform the method of any of clauses 17-28.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The invention claimed is:

1. A method of wireless communication for a first user equipment (UE), comprising:
determining a sidelink configuration of a second UE that is configured with a discontinuous reception (DRX) mode;
transmitting a sidelink wake up signal on a configured resource monitored by the second UE during the DRX mode, wherein a selection of a sequence of the sidelink wake up signal or a selection of the configured resource indicates a type of information requested by the first UE and wherein selection of a first sequence indicates a request for a reference signal or sidelink synchronization signal and selection of a second sequence indicates a request for data; and
receiving, from the second UE, the type of information requested by the first UE.

2. The method of claim 1, wherein a sequence on a first configured resource indicates a request for a reference signal and the sequence on a second configured resource indicates a request for data.

3. The method of claim 1, wherein the selection of the sequence for the sidelink wake up signal is based on a mapping from a provider service identifier (PSID) to a destination ID at a vehicle to anything (V2X) layer.

4. The method of claim 3, wherein the sidelink wake up signal carries the destination ID.

5. The method of claim 1, wherein the sidelink wake up signal implies a time window during which the first UE receives the type of information requested by the first UE.

6. The method of claim 1, wherein the sidelink wake up signal implies a parameter of a data transmission.

7. The method of claim 1, further comprising transmitting scheduling information after the sidelink wake up signal.

8. The method of claim 1, wherein the sidelink wake up signal is on behalf of a group of UEs, wherein the type of information requested by the first UE is received via a groupcast message.

9. The method of claim 8, further comprising configuring a time window for the group of UEs to receive the groupcast message.

10. The method of claim 8, wherein the sidelink wake up signal includes a groupcast identifier on a configured resource that indicates a type of information for the group of UEs.

11. The method of claim 1, wherein the configured resource monitored by the second UE during a DRX mode is within a slot offset after a slot configured for a sidelink synchronization signal block (S-SSB) of the second UE.

12. The method of claim 1, further comprising transmitting a sidelink related cell wake up signal that requests a base station to transmit system information for sidelink communication.

13. A method of wireless communication for a second user equipment (UE), comprising:
  determining a sidelink configuration for the second UE including a discontinuous reception (DRX) mode;
  receiving, from a first UE, a sidelink wake up signal on a configured resource monitored by the second UE during the DRX mode, wherein selection of a sequence of the sidelink wake up signal or a selection of the configured resource indicates a type of information requested by the first UE and wherein selection of a first sequence indicates a request for a reference signal or sidelink synchronization signal and selection of a second sequence indicates a request for data; and
  transmitting the type of information requested by the first UE.

14. The method of claim 13, wherein a sequence on a first configured resource indicates a request for a reference signal and the sequence on a second configured resource indicates a request for data.

15. The method of claim 13, further comprising mapping, at a vehicle to anything (V2X) layer, a destination ID of the sidelink wake up signal to a sidelink provider service identifier (PSID).

16. The method of claim 15, wherein the sidelink wake up signal carries the destination ID.

17. The method of claim 13, wherein transmitting the type of information requested by the first UE comprises transmitting the type of information requested by the first UE within a time window based on the sidelink wake up signal.

18. The method of claim 13, wherein the sidelink wake up signal implies a parameter of a data transmission.

19. The method of claim 13, further comprising receiving sidelink scheduling information after the sidelink wake up signal.

20. The method of claim 13, wherein the sidelink wake up signal is on behalf of a group of UEs, wherein transmitting the type of information requested by the first UE comprises transmitting a groupcast message.

21. The method of claim 20, further comprising determining a time window for the group of UEs to receive the groupcast message based on the sidelink wake up signal.

22. The method of claim 20, wherein the sidelink wake up signal includes a groupcast identifier on a configured resource that indicates a type of information for the group of UEs.

23. The method of claim 13, wherein the configured resource monitored by the second UE during a DRX mode is within a slot offset after a slot configured for a sidelink synchronization signal block (S-SSB) of the second UE.

24. An apparatus of a first user equipment (UE), comprising:
  a memory storing computer-executable instructions; and
  at least one processor coupled with the memory and configured to execute the computer-executable instructions to:
    determine a sidelink configuration of a second UE that is configured with a discontinuous reception (DRX) mode;
    transmit a sidelink wake up signal on a configured resource monitored by the second UE during the DRX mode, wherein a selection of a sequence of the sidelink wake up signal or a selection of the configured resource indicates a type of information requested by the first UE and wherein selection of a first sequence indicates a request for a reference signal or sidelink synchronization signal and selection of a second sequence indicates a request for data; and
    receive, from the second UE, the type of information requested by the first UE.

25. The apparatus of claim 24, wherein selection of a first sequence or first configured resource indicates a request for a reference signal or sidelink synchronization signal and selection of a second sequence or second configured resource indicates a request for data.

26. The apparatus of claim 24, wherein the sidelink wake up signal is on behalf of a group of UEs, wherein the type of information requested by the first UE is received via a groupcast message.

27. An apparatus of a second user equipment (UE), comprising:
  a memory storing computer-executable instructions; and
  at least one processor coupled with the memory and configured to execute the computer-executable instructions to:
    determine a sidelink configuration for the second UE including a discontinuous reception (DRX) mode;
    receive, from a first UE, a sidelink wake up signal on a configured resource monitored by the second UE during the DRX mode, wherein selection of a sequence of the sidelink wake up signal or a selection of the configured resource indicates a type of information requested by the first UE and wherein selection of a first sequence indicates a request for a reference signal or sidelink synchronization signal and selection of a second sequence indicates a request for data; and
    transmit the type of information requested by the first UE.

28. The apparatus of claim 27, further comprising mapping the selection of a sequence of the sidelink wake up signal or the selection of the configured resource to a type of information requested by the first UE.

* * * * *